(12) United States Patent
Ishizuka et al.

(10) Patent No.: US 9,997,786 B2
(45) Date of Patent: Jun. 12, 2018

(54) STEEL FOIL AND METHOD FOR MANUFACTURING THE SAME

(71) Applicants: Nippon Steel & Sumitomo Metal Corporation, Tokyo (JP); Nippon Steel & Sumikin Materials Co., Ltd., Tokyo (JP)

(72) Inventors: Kiyokazu Ishizuka, Tokyo (JP); Yuji Kubo, Tokyo (JP); Jun Nakatsuka, Tokyo (JP); Shuji Nagasaki, Tokyo (JP)

(73) Assignees: NIPPON STEEL & SUMITOMO METAL CORPORATION, Tokyo (JP); NIPPON STEEL & SUMIKIN MATERIALS CO., LTD., Tokyo (JP)

( * ) Notice: Subject to any disclaimer, the term of this patent is extended or adjusted under 35 U.S.C. 154(b) by 391 days.

(21) Appl. No.: 14/343,466

(22) PCT Filed: Apr. 18, 2013

(86) PCT No.: PCT/JP2013/061472
§ 371 (c)(1),
(2) Date: Mar. 7, 2014

(87) PCT Pub. No.: WO2013/157598
PCT Pub. Date: Oct. 24, 2013

(65) Prior Publication Data
US 2015/0037684 A1 Feb. 5, 2015

(30) Foreign Application Priority Data
Apr. 19, 2012 (JP) .................... 2012-095840

(51) Int. Cl.
*H01M 4/66* (2006.01)
*B21B 1/40* (2006.01)
(Continued)

(52) U.S. Cl.
CPC .............. *H01M 4/662* (2013.01); *B21B 1/40* (2013.01); *B32B 15/013* (2013.01);
(Continued)

(58) Field of Classification Search
CPC ......... C22C 38/14; C22C 38/12; C22C 19/03; C22C 38/00; C22C 38/001; C22C 38/002;
(Continued)

(56) References Cited

U.S. PATENT DOCUMENTS

2009/0038716 A1* 2/2009 Takeuchi ............... C22C 38/06
148/505
2010/0099031 A1 4/2010 Kato et al.

FOREIGN PATENT DOCUMENTS

| CN | 1213587 | 4/1990 |
|----|---------|--------|
| CN | 1274018 | 11/2000 |

(Continued)

OTHER PUBLICATIONS

European Search Report dated Nov. 10, 2015 issued in corresponding European Application No. 13779056.4.
(Continued)

*Primary Examiner* — Jenny R Wu
(74) *Attorney, Agent, or Firm* — Birch, Stewart, Kolasch & Birch, LLP

(57) ABSTRACT

A steel foil according to an aspect of the present invention includes, by mass %, C: 0.0001 to 0.02%; Si: 0.001 to 0.01%; Mn: 0.01 to 0.3%; P: 0.001 to 0.02%; S: 0.0001 to 0.01%; Al: 0.0005 to 0.1%; N: 0.0001 to 0.004%; and a balance consisting of Fe and impurities, wherein a thickness is 5 to 15 μm, and a tensile strength is more than 900 MPa and 1.200 MPa or less.

9 Claims, 1 Drawing Sheet

(51) Int. Cl.

| | |
|---|---|
| *C25D 5/34* | (2006.01) |
| *C22C 38/00* | (2006.01) |
| *C22C 38/06* | (2006.01) |
| *C22C 38/14* | (2006.01) |
| *C25D 5/36* | (2006.01) |
| *B32B 15/01* | (2006.01) |
| *C22C 19/03* | (2006.01) |
| *C22C 38/02* | (2006.01) |
| *C22C 38/04* | (2006.01) |
| *C22C 38/12* | (2006.01) |
| *C25D 7/06* | (2006.01) |
| *H01M 4/82* | (2006.01) |
| *C21D 8/04* | (2006.01) |
| *C21D 9/46* | (2006.01) |
| *H01M 10/0525* | (2010.01) |

(52) U.S. Cl.
CPC .......... *B32B 15/015* (2013.01); *C21D 8/0436* (2013.01); *C21D 8/0478* (2013.01); *C22C 19/03* (2013.01); *C22C 38/00* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/12* (2013.01); *C22C 38/14* (2013.01); *C25D 5/34* (2013.01); *C25D 5/36* (2013.01); *C25D 7/0614* (2013.01); *H01M 4/82* (2013.01); *C21D 9/46* (2013.01); *C21D 2211/004* (2013.01); *C21D 2251/02* (2013.01); *H01M 10/0525* (2013.01)

(58) Field of Classification Search
CPC . C22C 38/004; C22C 38/02; C21D 2211/004; C21D 2251/02; C21D 8/0436; C21D 8/0478; C21D 9/46; B21B 1/40; B32B 15/013; B32B 15/015
See application file for complete search history.

(56) References Cited

FOREIGN PATENT DOCUMENTS

| | | |
|---|---|---|
| EP | 0826436 A1 | 3/1998 |
| JP | 6-116647 A | 4/1994 |
| JP | 06116647 A * | 4/1994 |
| JP | 06-310126 | 11/1994 |
| JP | 06-310147 | 11/1994 |
| JP | 07-220721 | 8/1995 |
| JP | 07-249409 | 9/1995 |
| JP | 11-033605 A1 | 2/1999 |
| JP | 11-189841 A | 7/1999 |
| JP | 2002-083594 | 3/2002 |
| JP | 2003-007305 | 1/2003 |
| JP | 2004-288520 | 10/2004 |
| JP | 2007-009272 | 1/2007 |
| JP | 2009-295470 A | 12/2009 |
| JP | 2010-033782 | 2/2010 |
| JP | 2011-171158 | 9/2011 |
| JP | 2012-033470 | 2/2012 |
| JP | 2013-051113 | 3/2013 |
| WO | WO2012-005355 | 1/2012 |
| WO | WO 2012005355 A1 * | 1/2012 ............ B23K 20/04 |

OTHER PUBLICATIONS

International Search Report dated Jul. 30, 2013 issued in corresponding PCT Application No. PCT/JP2013/061472 [with English Translation].

Japanese Notice of Reasons for Rejection for Japanese Application No. 2013-547768, dated Sep. 20, 2016, with an English translation.

Japanese Notice of Allowance for counterpart Japanese Application No. 2013-547768, dated Mar. 7, 2017, with an English translation thereof.

* cited by examiner

STEEL FOIL AND METHOD FOR MANUFACTURING THE SAME

TECHNICAL FIELD

The present invention relates to a steel foil which can be used in a negative electrode current-collecting foil of a nonaqueous electrolyte secondary battery represented as a lithium ion secondary battery, and a method for manufacturing the same.

This application is a national stage application of International Application No. PCT/JP2013/061472, filed Apr. 18, 2013, which claims priority to Japanese Patent Application No. 2012-095840, filed on Apr. 19, 2012, the disclosures of which are incorporated herein by reference in their entirety.

BACKGROUND ART

Since nonaqueous electrolyte secondary batteries represented as lithium ion secondary batteries have high energy density, the nonaqueous electrolyte secondary batteries are used as power sources for mobile communication and portable information terminals. In recent years, the nonaqueous electrolyte secondary batteries have been started to be practical for use in vehicles, and the nonaqueous electrolyte secondary battery market has rapidly expanded. Accordingly, in order to pursue a further reduction in size and weight of equipment, there has been a demand for performance improvement for achieving a further reduction in size and weight of batteries occupying a large volume in the equipment.

Currently, negative electrode active materials used in the secondary batteries (hereinafter, referred to as "active materials" in some cases) are mainly graphite-based carbon materials. The graphite-based carbon materials are key materials influencing the performance of the batteries. However, an amount of lithium which can be reversibly intercalated and deintercalated in the graphite-based carbon material is limited to one lithium atom per 6 carbon atoms. A theoretical charging/discharging limit capacity of the carbon material calculated from the limit value is 372 mAh/g in terms of electric capacity. Since the current secondary batteries have been used at a level close to the limit capacity, it is difficult to expect a remarkable performance improvement in the future.

Under the circumstances, searches for materials other than carbon are being conducted, for example, materials which are alloys or inorganic compounds and have an electric capacity of much higher than 372 mAh/g. Among them, particularly, in crystalline oxide materials containing tin and/or silicon or amorphous oxide materials, materials exhibiting a discharge capacity close to 1,000 mAh/g have been found (for example, refer to Patent Documents 1 and 2).

However, the above-described high capacity active materials undergo larger volume fluctuations, caused by lithium intercalation and deintercalation, than the graphite-based carbon materials in the related art. Thus, as the charging/discharging cycle is repeated, pulverization of the active materials, exfoliation of the active materials from current collectors, or the like occurs. As described above, the active materials disclosed in Patent Documents 1 and 2 have a problem in that good charging/discharging cycle property cannot be obtained.

Regarding the problem, it has been found that an electrode for a lithium secondary battery formed by depositing an amorphous silicon thin film or a microcrystalline silicon thin film on a current collector such as a copper foil as an active material by a CVD method or a sputtering method exhibits good charging/discharging cycle property (refer to Patent Document 3). This is because the active material thin film tightly adheres to the current collector.

In addition, a method has been found for manufacturing a current collector by disposing a conductive intermediate layer containing polyimide between the layers containing the silicon-based active material, or between the layer containing the silicon-based active material and the metal foil current collector as a binder, and then, in the state in which the conductive intermediate layer is disposed on the metal foil current collector, sintering the deposited body in a non-oxidizing atmosphere (refer to Patent Document 4). Here, the conductive intermediate layer prevents a mixture layer from being exfoliated from the current collector by the expansion and constriction of the negative electrode active material accompanying a charge/discharge reaction, and thus, adhesion between the mixture layer and the current collector is enhanced.

However, since the active material layer tightly adheres to the current collector in such an electrode for a lithium secondary battery, there is a problem in that a large stress is applied to the current collector due to a volume fluctuation of the active material thin film accompanying the charge/discharge reaction. Due to the stress, deformation occurs in the current collector, wrinkles are generated, and further, the adhesion between the current collector and the active material is deteriorated. Thus, the battery life is reduced.

To suppress stress generation, there is a demand for a current collector which has a higher strength so that the current collector can resist the stress caused by volume expansion of the active material. As one way to enhance the tensile strength of the current collector, it can be considered that the thickness of the current collector is increased. However, there are disadvantages in that a significant enhancement in the tensile strength of the current collector cannot be expected simply by increasing the thickness of the current collector and also the energy density of the battery is reduced due to an increase in the weight and volume of the battery.

Currently, as metal foils for negative electrode current collectors, a copper foil is mainly used. A representative copper foil for the negative electrode current collector includes a copper foil manufactured by rolling and a copper foil (electrolytic copper foil) manufactured by an electrolysis method. However, with respect to high-strengthening of the current collector using the copper foil, there is a limitation in the use of the electrolytic copper foil. Accordingly, a method for manufacturing a high-strength copper foil by a rolling method has been considered, and it has been proposed that the rolled copper alloy foil be used as the negative electrode current collector (refer to Patent Document 5).

However, as the thickness of the rolled copper foil is reduced, manufacturing cost increases. Therefore, the rolled copper foil is expensive. Therefore, it is possible to obtain a thin and high-strength current collector, but this current collector has a problem in that economic efficiency is deteriorated.

Further, the use of the copper foil as the negative electrode current collector is not an optimal choice from the viewpoint of battery properties. When the lithium ion secondary battery normally works, the potential of the negative electrode is less than 2 V vs. Li in many cases, which is very low. However, when a short circuit or over-discharge occurs in the battery, the potential of the negative electrode is more than 3 V vs. Li in some cases. At such high potential, there is a problem in that the copper is rapidly dissolved and battery properties are deteriorated.

Further, since copper is a metal having a large specific gravity (specific gravity: 8.9), in the case where the copper foil is used as the negative electrode current collector, a weight ratio of the negative electrode current collecting foil occupying the battery is relatively increased and energy density per weight of the battery is prevented from being increased. In addition, there is an economic problem such as high cost in the copper foil. For example, the copper foil is expensive compared to an Al foil used in a positive electrode.

From the above-described circumstance, a negative electrode current collecting foil has been desired which is thin, high in strength, lightweight, economic, and excellent in metal elution resistance in over-discharge, and expectations have been placed on an iron-based foil as the material thereof.

Since the electric resistance of iron is large compared to that of copper, it is difficult to use iron as as the current collector due to the iron's property. However, since a battery structure has been enhanced and battery applications and requested properties have been diversified in recent years, the electric resistance is not always a problem.

The following technique for a battery using an iron foil as the negative electrode current collector may be used. In Patent Document 6, it has been proposed that an electrolytic iron foil having a thickness of 35 µm or less be used as the negative electrode current collector. In addition, it has been also proposed that an electrolytic iron foil plated with Ni be used from the viewpoint of corrosion resistance.

However, it is difficult to increase the efficiency in electrolysis and the electrolytic iron foil is not always economic. In addition, Ni plating of the electrolytic foil is a factor which causes an increase in cost. Further, unless thickness of the Ni plating is formed thick (1 µm or more), when it has been over-discharged, Fe elution is unavoidable.

In Patent Document 7, it has been proposed that a metal foil obtained by depositing iron sesquioxide on a surface of an iron foil or a nickel-plated iron foil be used as a negative electrode current collector. However, even in the metal foil, Fe elution is unavoidable during over-discharging, and further, a side reaction easily occurs at the potential of the negative electrode. As a result, battery efficiency or battery life is easily deteriorated.

In Patent Document 8, a current collector of a ferritic stainless steel foil is disclosed. However, since the electric resistance of the ferritic stainless steel foil is large, particularly, if the thickness of the current collector is reduced, a problem such as heating becomes apparent. In addition, the ferritic stainless steel foil is not economic compared to the copper foil.

Generally, in the field of high-strengthening of steel, a component composition or a heat treatment condition is devised and high-strengthening is achieved using a strengthening mechanism such as solid solution hardening, precipitation strengthening or textural strengthening so that various high-strength steel sheets have been put into use. However, if the high-strength steel sheets of the related art are applied to negative electrode current collectors of secondary batteries, under the influence of an additive component or precipitation form thereof, the electric resistance of the high-strength steel sheets tends to increase compared to that of general steel, and particularly, when the thickness is thin, there is a problem in that the tendency becomes stronger.

With respect to a desired negative electrode current collecting foil of a nonaqueous electrolyte secondary battery in the present invention, particularly, there is a strong demand for a reduction in thickness, and thus, in the high-strength steel of the related art, it is difficult to make strength and electric resistance compatible after a reduction in thickness.

In Patent Document 9, a copper coated steel foil for carrying a negative electrode active material of a lithium ion secondary battery is disclosed. However, the strength of the foil does not satisfy a required level and knowledge concerned with compatibility between the high-strengthening and the electric resistance of the foil is not disclosed. In the technique, since the outermost layer is coated with copper which is soft and has deteriorated heat resisting properties compared to steel, particularly, the strength is easily reduced after heating. Further, since the surface is coated with copper, over-discharge solubility is just the same as that of the copper foil and a remarkable effect of improvement by the disclosed configuration cannot be observed.

PRIOR ART DOCUMENT

Patent Document

[Patent Document 1] Japanese Unexamined Patent Application. First Publication No. H07-220721
[Patent Document 2] Japanese Unexamined Patent Application, First Publication No. H07-249409
[Patent Document 3] Japanese Unexamined Patent Application, First Publication No. 2002-83594
[Patent Document 4] Japanese Unexamined Patent Application. First Publication No. 2004-288520
[Patent Document 5] Japanese Unexamined Patent Application, First Publication No. 2003-7305
[Patent Document 6] Japanese Unexamined Patent Application, First Publication No. H06-310147
[Patent Document 7] Japanese Unexamined Patent Application, First Publication No. H06-310126
[Patent Document 8] Japanese Unexamined Patent Application, First Publication No. 2010-33782
[Patent Document 9] Japanese Unexamined Patent Application. First Publication No. 2012-33470

SUMMARY OF THE INVENTION

Problems to be Solved by the Invention

The present invention is to provide a steel foil for a negative electrode current collector in which both strength and electric resistance, which are normally in a trade-off relationship, are compatible by using a steel foil which is thin, high in strength, lightweight, and economic.

Means for Solving the Problems

The gist of the present invention for achieving this object is as follows.

(1) A steel foil according to an aspect of the present invention includes, by mass %, C: 0.0001 to 0.02%; Si: 0.001 to 0.01%; Mn: 0.01 to 0.3%; P: 0.001 to 0.02%; S: 0.0001 to 0.01%; Al: 0.0005 to 0.1%; N: 0.0001 to 0.004%; and a balance consisting of Fe and impurities, in which a thickness is 5 µm or more and 15 µm or less, and a tensile strength is more than 900 MPa and 1,200 MPa or less.

(2) The steel foil according to (1) may further include one or both of, by mass %, Ti: 0.1% or less; and Nb: 0.1% or less.

(3) Regarding the steel foil according to (1) or (2), a Ni plated layer or a Cr plated layer may be included on an outermost layer of the steel foil.

(4) A method for manufacturing a steel foil according to another aspect of the present invention includes foil-rolling a steel sheet including, by mass %, C: 0.0001 to 0.02%, Si: 0.001 to 0.01%, Mn: 0.01 to 0.3%, P: 0.001 to 0.02%, S: 0.0001 to 0.010%, Al: 0.0005 to 0.1% and N: 0.0001 to 0.004%, and a balance consisting of Fe and impurities, so as to be the steel foil having a thickness of 5 μm or more and 15 μm or less and a tensile strength of more than 900 MPa and 1,200 MPa or less by a cold-rolling under a cumulative rolling reduction of 90 to 98%.

(5) Regarding the method for manufacturing the steel foil according to (4), the steel sheet may further include one or both of, by mass %, Ti: 0.1% or less; and Nb: 0.1% or less.

(6) The method for manufacturing the steel foil according to (4) or (5) may further include plating an outermost layer of the steel foil so as to form a Ni plated layer or a Cr plated layer after the foil-rolling.

(7) Regarding the method for manufacturing the steel foil according to (6), the Ni plated layer may be a soft Ni plated layer.

(8) The method for manufacturing the steel foil according to (4) or (5) may further include plating an outermost layer of the steel sheet so as to form a Ni plated layer before the foil-rolling.

(9) Regarding the method for manufacturing the steel foil according to (8), the Ni plated layer may be a soft Ni plated layer.

Effects of the Invention

According to the present invention, it is possible to obtain a steel foil which is thin, high in strength, lightweight, and economic.

EMBODIMENTS OF THE INVENTION

Figure 1:
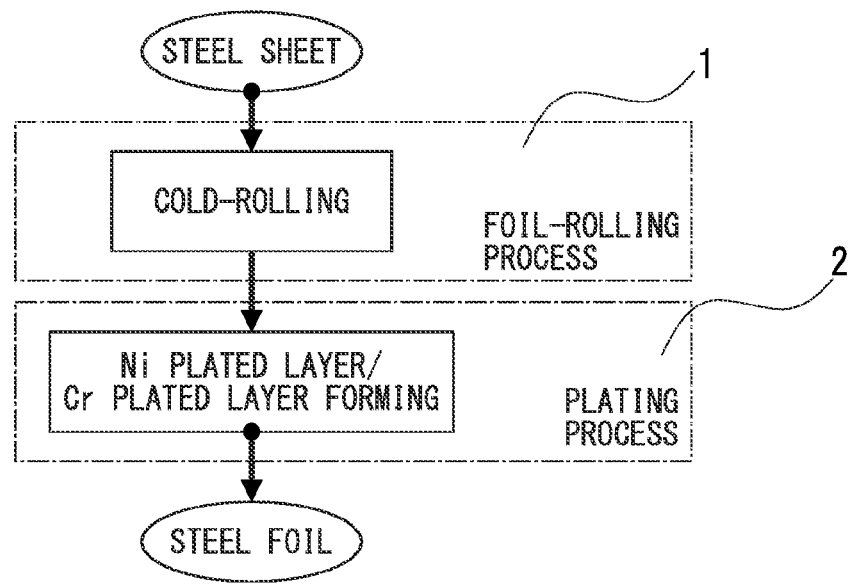
FIG. 1 is a flowchart showing a method for manufacturing a steel foil according to the present invention.

A rolling steel foil for a negative electrode current collector according to an embodiment (hereinafter, referred to as a "steel foil according to an embodiment" in some cases) includes the following component composition (% means mass %) and has a thickness of 5 to 15 μm and a tensile strength of more than 900 MPa and 1,200 MPa or less.

C: 0.0001 to 0.02%,
Si: 0.001 to 0.01%,
Mn: 0.01 to 0.3%,
P: 0.001 to 0.02%
S: 0.0001 to 0.01%,
Al: 0.0005 to 0.1%,
N: 0.0001 to 0.004%, and
a balance consisting of Fe and impurities.

In addition, a method for manufacturing the steel foil according to the embodiment includes foil-rolling on a steel sheet including the aforementioned component composition (mass %) so as to be the steel foil having a thickness of 5 to 15 μm and a tensile strength of more than 900 MPa and 1,200 MPa or less by a cold-rolling under a cumulative rolling reduction of 90% or more.

The steel foil according to the embodiment does not adopt a strengthening mechanism, such as solid solution hardening, precipitation strengthening, or textural strengthening, which is used in general high-strength steel. Contents of all elements to enhance strength are suppressed at a level lower than in high-strength steel of the related art, and instead, the strength is secured using work hardening which will be described later. Therefore, both strength and electric resistance can be compatible.

The reason for limiting the component composition of the steel foil according to the embodiment will be described below. Here, % means mass %.

(C: 0.0001 to 0.02%)

C is an element that enhances the strength of the steel, but if an excessive amount of C is contained, the electric resistance of the steel is deteriorated in some cases. Therefore, the upper limit of the C content is set to 0.02%. The lower limit of the C content is not particularly limited, but a limit in a current refining technique is about 0.0001%, which is set to the lower limit. The C content is more preferably 0.001 to 0.01%.

(Si: 0.001 to 0.01%)

Si is an element that enhances the strength of the steel, but if an excessive amount of Si is contained, the electric resistance of the steel is deteriorated in some cases. Therefore, the upper limit of the Si content is set to 0.01%. If the Si content is less than 0.001%, refining cost increases, and thus, the lower limit of the Si content is set to 0.001%. The Si content is more preferably 0.001 to 0.008%.

(Mn: 0.01 to 0.3%)

Mn is an element that enhances the strength of the steel, but if an excessive amount of Mn is contained, the electric resistance of the steel is deteriorated in some cases. Therefore, the upper limit of the Mn content is set to 0.3%. If the Mn content is less than 0.01%, refining cost increases, the rollability is reduced due to excessive softening of the steel, and manufacturing cost increases in some cases. Therefore, the lower limit of the Mn content is set to 0.01%. The Mn content is more preferably 0.05 to 0.2%.

(P: 0.001 to 0.02%)

P is an element that enhances the strength of the steel, but if an excessive amount of P is contained, the electric resistance of the steel is deteriorated in some cases. Therefore, the upper limit of the P content is set to 0.02%. If the P content is less than 0.001%, refining cost increases in some cases, and thus, the lower limit of the P content is set to 0.001%. The P content is more preferably 0.001 to 0.01%.

(S: 0.0001 to 0.01%)

Since S is an element that reduces the hot workability and corrosion resistance of the steel, S content is preferably the smaller. Further, in a case of a thin steel foil as the steel foil according to the embodiment, if a large amount of S is contained, the electric resistance is deteriorated by inclusions generated by the presence of S, or the strength of the steel is reduced in some cases. Therefore, the upper limit of the S content is set to 0.01%. If the S content is less than 0.0001%, refining cost increases in some cases, and thus, the lower limit of the S content is set to 0.0001%. The S content is more preferably 0.001 to 0.008%.

(Al: 0.0005 to 0.1%)

Al is contained 0.0005% or more as a deoxidizing element in the steel. If an excessive amount of Al is contained, the electric resistance is deteriorated and manufacturing cost increases in some cases. Therefore, the upper limit of the Al content is set to 0.1%. The Al content is more preferably 0.01% to 0.05%.

(N: 0.0001 to 0.004%)

Since N is an element that reduces the hot workability and workability of the steel, N content is preferably the smaller. Therefore, the upper limit of the N content is set to 0.004%.

If the N content is less than 0.0001%, cost increases in some cases. Therefore, the lower limit of the N content is set to 0.0001%. The N content is more preferably 0.001% to 0.003%.

(Balance Fe and Impurities)

The balance of the component of the steel foil according to the embodiment includes Fe and impurities, and further, may include one or both of Ti: 0.1% or less, and Nb: 0.1% or less. Ti and/or Nb fix(es) C and N in the steel as a carbide and a nitride and is(are) capable of enhancing the workability of the steel. However, if an excessive amount is added, manufacturing cost increases and the electric resistance is deteriorated in some cases. The content ranges are preferably Ti: 0.01 to 0.8%, and Nb: 0.005 to 0.05%. The content ranges are more preferably Ti: 0.01 to 0.1%, and Nb: 0.005 to 0.04%.

Further, the steel foil according to the embodiment may additionally include B, Cu, Ni, Sn, Cr and the like within a range in which the properties of the steel foil according to the embodiment are not impaired.

The thickness of the steel foil according to the embodiment is 5 μm or more and 15 μm or less. This is because the battery achieves a reduction in size and weight, and a thin current collecting foil, that is, a thin steel foil is demanded. From the viewpoint of a reduction in size and weight, the thinner the steel foil, thickness of steel foil is more preferably the thinner, and there is no need to particularly limit the lower limit. However, considering cost and uniformity of thickness, the thickness thereof may be 5 μm or more. In addition, when steel not satisfying the above-described component composition is rolled to manufacture a steel foil, the electric resistance is remarkably deteriorated in some cases in a region where the thickness of steel foil is 15 μm or less.

The tensile strength of the steel foil according to the embodiment is more than 900 MPa and 1,200 MPa or less. Here, the tensile strength is a value measured at room temperature. When the tensile strength is 900 MPa or less, there may be a problem in that the steel foil is distorted or the active material is exfoliated due to expansion and constriction of an active material accompanying charging/discharging. This tendency becomes remarkable when a high capacity negative electrode active material is applied to the steel foil.

From the viewpoint of preventing the distortion of the steel foil and the exfoliation of the active material, particularly, there is no need to limit the upper limit of the tensile strength. However, as considering easiness of handling and stability when the strength is obtained using work strengthening by industrial rolling, a substantial upper limit of the tensile strength of the steel foil is 1,200 MPa.

The steel foil according to the embodiment is preferably elongated some extent, but if the steel foil is not elongated (at an immeasurable level), there is no obstacle to achieve the object of the present invention. A preferable elongation of the steel foil according to the embodiment is 0.1% or more.

Generally, when a current collecting foil is coated with an active material to prepare an electrode, a heat treatment at a maximum temperature of about 400° C. is performed in some cases. The steel foil according to the embodiment has good heat resisting properties, in addition to the tensile strength, and even when the heat treatment at about 400° C. is performed, the strength is hardly reduced at all, and even when the strength is reduced, the maximum reduction of the tensile strength is about 10%. Here, the reduction ratio of the tensile strength is a percentage of a reduction amount of tensile strength to the tensile strength before the heat treatment.

Figure 2:
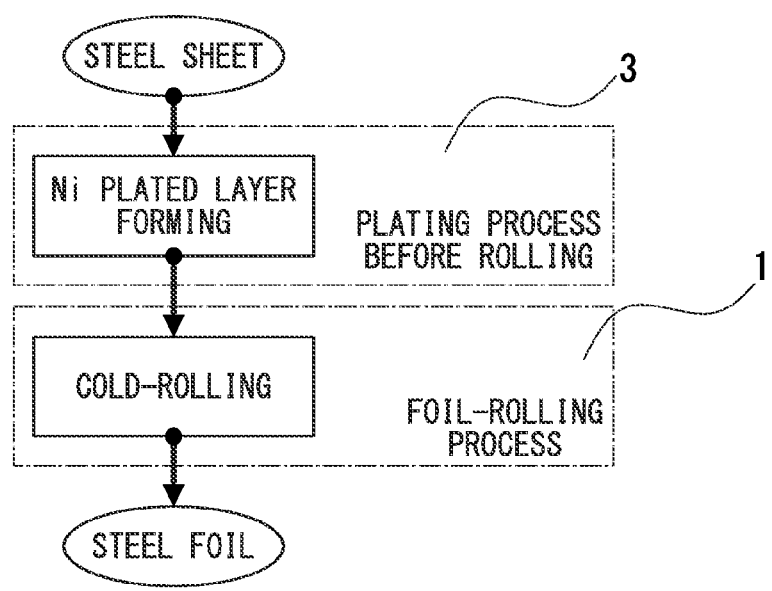
FIG. 2 is a flowchart showing the method for manufacturing the steel foil according to the present invention.

The method for manufacturing the steel foil according to the embodiment shown in FIGS. 1 and 2 is as follows. First, according to a normal method for manufacturing a steel sheet, a sheet (steel sheet) having the aforementioned predetermined component composition is manufactured. Then, the aforementioned sheet is formed into a steel foil having a thickness of 5 μm or more and 15 μm or less by cold-rolling under a large reduction (foil-rolling). Using work hardening generated by cold-rolling under the large reduction, a high strength of more than 900 MPa and 1,200 MPa or less is achieved.

The cumulative rolling reduction during the foil-rolling is set to 90% or more. Here, the cumulative rolling reduction is a percentage of a cumulative rolling reduction amount to an initial thickness at an entrance of a rolling stand (a difference between a thickness at the entrance before an initial pass and a thickness at the exit after a final pass). If the cumulative rolling reduction is less than 90%, sufficient foil strength is not expressed. The cumulative rolling reduction during the foil-rolling is preferably 95% or more. The upper limit of the cumulative rolling reduction is not particularly limited. However, in a normal rolling capacity, the limit of the achievable cumulative rolling reduction is about 98%. The cold-rolling is performed by one or plural times of passes, but if an annealing treatment is performed during the rolling, sufficient tensile strength is not achieved in some cases. Accordingly, it is preferable that an annealing treatment not be performed during the rolling. Since the steel foil according to the embodiment has good rollability due to the component composition, annealing is not necessary during the rolling.

The outermost layer of the steel foil according to the embodiment may be plated with Ni, Cr or the like after the foil-rolling. Due to this, metal elution in over-discharge can be improved. Depending on the kind of plating, not only is there no effect of improvement, but also elution may be deteriorated. Particularly, Cu plating, Zn plating and the like cannot be used in the steel foil of the present invention. Further, depending on the kind of plating, the strength may be reduced.

In addition, plating with Ni or Cr or the like on a steel sheet before foil-rolling (plating before rolling) and the steel sheet (sheet) having a plated layer on this outermost layer can be foil-rolled under the aforementioned condition. However, in this case, it is necessary to pay close attention to selection of plating. For example, if the elongation of the plating is smaller than the elongation of the steel during foil-rolling, a defect such as a crack occurs on the plated layer, and this defect causes a reduction in foil strength in some cases. Particularly, if a hard layer such as a metal intermetallic compound layer is present at an interface between a substrate and the plating, in the case where rolling is performed under the condition of a cumulative rolling reduction of 90% or more, the foil strength is remarkably reduced in some cases. For example, even with the plating in which the elongation of the plating such as Cu plating is large and a defect such as a crack does not easily occur during foil-rolling, if the plated layer itself is too soft, the foil strength is easily reduced, which is not preferable.

In addition, in the case where the elongation of the plating is smaller or larger than the elongation of the steel foil, even when the plating is performed after foil-rolling, the foil strength may still be influenced for the worse. If the elongation of the plating is smaller than the elongation of the steel foil, in the case where the steel foil shrinks due to a temperature change, a defect such as a crack may occur. If the elongation of the plating is larger than the elongation of the steel foil, the foil strength is still easily reduced.

As plating not reducing the foil strength, soft Ni plating is particularly preferable. Specifically, pure Ni plating having only impurities adhered on the steel sheet is subjected to a heat treatment at 300° C. or higher, and accordingly, Ni plating in which the strain of the plated layer is released is the soft Ni plating in the embodiment.

When the steel sheet is foil-rolled in the state that plating other than the Ni plating or Cr plating is applied, the foil strength is reduced for the aforementioned reasons, and desired performance in the present invention may not be obtained. Further, when the steel foil after the foil-rolling is subjected to plating other than Ni plating or Cr plating, the foil strength is still reduced in some cases for the aforementioned reasons.

A preferable adhesion amount range of the Ni plating adhered on the steel foil according to the embodiment is 1 g/m$^2$ or more. As the adhesion amount of Ni plating increases, metal elution is improved, but cost increases. Even when the adhesion amount of Ni is more than 50 g/m$^2$, there is no remarkable performance improvement, and thus, a substantial upper limit of adhesion amount of the Ni is 50 g/m$^2$ from the viewpoint of cost-effectiveness. A more preferable adhesion amount of Ni plating is 5 to 20 g/m$^2$.

A preferable adhesion amount range of the Cr plating adhered on the steel foil according to the embodiment is 0.01 g/m$^2$ or more. When the adhesion amount of Cr is more than 0.5 g/m$^2$, a crack in the plated layer on the steel foil increases, there is no effect of metal elution improvement due to the crack, and thus, the foil strength is reduced in some cases. From the viewpoint of metal elution, the Cr plating has a remarkable effect with a smaller adhesion amount compared to the Ni plating. A more preferable adhesion amount of Cr plating is 0.1 to 0.3 g/m$^2$.

EXAMPLES

Next, Examples of the present invention will be described. Conditions in Examples are examples adopted to confirm feasibility and an effect of the present invention and the present invention is not limited to these examples. The present invention can adopt various conditions as long as the object of the present invention is achieved within a range of not departing from the gist of the present invention.

Examples 1 to 21 and Comparative Examples 1 to 9

Using a normal method for manufacturing a steel sheet, cold-rolled steel sheets (annealed materials) with component compositions shown in Table 1 were manufactured and then subjected to foil-rolling. The original thicknesses of the cold-rolled steel sheet, the cumulative rolling reduction in foil-rolling, and the foil thicknesses are shown in Table 1.

TABLE 1

| | | STEEL COMPONENT mass % | | | | | | | | ORIGINAL THICKNESS | ROLLING |
|---|---|---|---|---|---|---|---|---|---|---|---|
| | | C | Si | Mn | P | S | Al | N | Ti | Nb | mm | REDUCTION % |
| EXAMPLES | 1 | 0.0120 | 0.010 | 0.12 | 0.012 | 0.0090 | 0.090 | 0.002 | — | — | 0.30 | 95 |
| | 2 | 0.0060 | 0.007 | 0.11 | 0.012 | 0.0090 | 0.090 | 0.002 | — | — | 0.30 | 95 |
| | 3 | 0.0030 | 0.007 | 0.11 | 0.012 | 0.0090 | 0.090 | 0.002 | — | — | 0.30 | 95 |
| | 4 | 0.0019 | 0.009 | 0.09 | 0.012 | 0.0042 | 0.045 | 0.002 | 0.02 | 0.019 | 0.30 | 95 |
| | 5 | 0.0010 | 0.009 | 0.09 | 0.012 | 0.0042 | 0.045 | 0.002 | 0.02 | 0.019 | 0.30 | 95 |
| | 6 | 0.0010 | 0.009 | 0.09 | 0.012 | 0.0042 | 0.045 | 0.002 | 0.08 | — | 0.30 | 95 |
| | 7 | 0.0015 | 0.009 | 0.09 | 0.012 | 0.0042 | 0.045 | 0.002 | — | 0.050 | 0.30 | 95 |
| | 8 | 0.0010 | 0.009 | 0.30 | 0.012 | 0.0042 | 0.045 | 0.002 | 0.08 | — | 0.30 | 95 |
| | 9 | 0.0019 | 0.009 | 0.09 | 0.020 | 0.0042 | 0.045 | 0.002 | 0.02 | 0.019 | 0.30 | 95 |
| | 10 | 0.0200 | 0.009 | 0.09 | 0.012 | 0.0042 | 0.045 | 0.002 | — | — | 0.15 | 90 |
| | 11 | 0.0015 | 0.009 | 0.09 | 0.012 | 0.0042 | 0.045 | 0.002 | — | 0.050 | 0.20 | 95 |
| | 12 | 0.0120 | 0.010 | 0.12 | 0.012 | 0.0090 | 0.090 | 0.002 | — | — | 0.20 | 94 |
| | 13 | 0.0120 | 0.010 | 0.12 | 0.012 | 0.0090 | 0.090 | 0.002 | — | — | 0.30 | 98 |
| | 14 | 0.0120 | 0.010 | 0.12 | 0.012 | 0.0090 | 0.090 | 0.002 | — | — | 0.30 | 97 |
| | 15 | 0.0120 | 0.010 | 0.12 | 0.012 | 0.0090 | 0.090 | 0.002 | — | — | 0.20 | 96 |
| | 16 | 0.0120 | 0.010 | 0.12 | 0.012 | 0.0090 | 0.090 | 0.002 | — | — | 0.20 | 95 |
| | 17 | 0.0120 | 0.010 | 0.12 | 0.012 | 0.0090 | 0.090 | 0.002 | — | — | 0.40 | 97 |
| | 18 | 0.0120 | 0.010 | 0.12 | 0.012 | 0.0090 | 0.090 | 0.002 | — | — | 0.15 | 90 |
| | 19 | 0.0019 | 0.009 | 0.09 | 0.012 | 0.0042 | 0.045 | 0.002 | 0.02 | 0.019 | 0.20 | 93 |
| | 20 | 0.0019 | 0.009 | 0.09 | 0.012 | 0.0042 | 0.045 | 0.002 | 0.02 | 0.019 | 0.20 | 95 |
| | 21 | 0.0006 | 0.009 | 0.09 | 0.020 | 0.0042 | 0.045 | 0.002 | — | 0.012 | 0.30 | 95 |
| COMPARATIVE EXAMPLES | 1 | 0.0500 | 0.007 | 0.11 | 0.012 | 0.0090 | 0.090 | 0.002 | — | — | 0.30 | 95 |
| | 2 | 0.0500 | 0.007 | 0.11 | 0.012 | 0.0090 | 0.090 | 0.002 | — | — | 0.30 | 70 |
| | 3 | 0.0500 | 0.007 | 0.11 | 0.012 | 0.0090 | 0.090 | 0.002 | — | — | 0.30 | 80 |
| | 4 | 0.0120 | 0.050 | 0.12 | 0.012 | 0.0090 | 0.090 | 0.002 | — | — | 0.30 | 95 |
| | 5 | 0.0010 | 0.009 | 1.00 | 0.012 | 0.0042 | 0.045 | 0.002 | 0.08 | — | 0.30 | 95 |
| | 6 | 0.0019 | 0.009 | 0.09 | 0.050 | 0.0042 | 0.045 | 0.002 | 0.02 | 0.019 | 0.30 | 95 |
| | 7 | 0.0019 | 0.009 | 0.09 | 0.012 | 0.0500 | 0.045 | 0.002 | 0.02 | 0.019 | 0.30 | 95 |
| | 8 | 0.0015 | 0.009 | 0.09 | 0.012 | 0.0042 | 0.045 | 0.002 | — | 0.050 | 0.20 | 85 |
| | 9 | 0.0060 | 0.007 | 0.11 | 0.012 | 0.0090 | 0.200 | 0.002 | — | — | 0.30 | 95 |

| | | FOIL THICKNESS μm | STRENGTH MPa | | ELECTRIC RESISTANCE | |
|---|---|---|---|---|---|---|
| | | | ONLY ROLLED | AFTER HEATING | μΩcm | EVALUATION |
| EXAMPLES | 1 | 15 | 1056 | 997 | 12.5 | A |
| | 2 | 15 | 1047 | 987 | 12.3 | A |

TABLE 1-continued

|  |  |  |  |  |  |  |
|---|---|---|---|---|---|---|
|  | 3 | 15 | 999 | 934 | 12.1 | A |
|  | 4 | 15 | 920 | 867 | 11.8 | A |
|  | 5 | 15 | 905 | 855 | 12.3 | A |
|  | 6 | 15 | 915 | 863 | 12.0 | A |
|  | 7 | 15 | 909 | 856 | 11.6 | A |
|  | 8 | 15 | 998 | 947 | 11.4 | A |
|  | 9 | 15 | 1001 | 950 | 12.2 | A |
|  | 10 | 15 | 913 | 883 | 15.1 | B |
|  | 11 | 10 | 901 | 856 | 12.1 | A |
|  | 12 | 12 | 995 | 935 | 12.4 | A |
|  | 13 | 6 | 1199 | 1135 | 13.0 | A |
|  | 14 | 9 | 1157 | 1093 | 12.8 | A |
|  | 15 | 8 | 1057 | 1063 | 12.6 | A |
|  | 16 | 10 | 1011 | 954 | 12.6 | A |
|  | 17 | 12 | 1140 | 1070 | 12.5 | A |
|  | 18 | 15 | 901 | 850 | 12.4 | A |
|  | 19 | 14 | 907 | 879 | 11.8 | A |
|  | 20 | 10 | 920 | 871 | 11.8 | A |
|  | 21 | 15 | 902 | 850 | 12.0 | A |
| COMPARATIVE EXAMPLES | 1 | 15 | 1201 | 1134 | 32.8 | D |
|  | 2 | 90 | 698 | 690 | 19.6 | C |
|  | 3 | 60 | 868 | 823 | 30.2 | D |
|  | 4 | 15 | 1151 | 1093 | 24.7 | D |
|  | 5 | 15 | 1158 | 1099 | 23.7 | D |
|  | 6 | 15 | 1201 | 1141 | 24.5 | D |
|  | 7 | 15 | 860 | 799 | 19.5 | C |
|  | 8 | 30 | 750 | 743 | 11.8 | A |
|  | 9 | 15 | 1088 | 1006 | 17.5 | C |

(Evaluation Method)

Over-discharge solubility: A three-electrode beaker cell was fabricated in a glove box under argon atmosphere (dew point: −60° C.). An edge and a rear surface of each of samples were sealed with tapes and the samples were used as working electrodes. Metal lithium was used as a counter electrode and a reference electrode. As an electrolyte, a solution that 1 mol/L of $LiPF_6$ was dissolved into a mixed solvent including ethylene carbonate and diethylene carbonate at a volume fraction of 1:1 was used.

The cell was retained at 25° C., and scanning was performed in a noble direction from the immersion potential at 5 mV/sec to measure the potential in which a current of 0.01 $mA/cm^2$ flows. Thus, the measured potential was set as a dissolved potential. The dissolved potential was represented as a Li reference potential (V).

Foil strength: In a direction parallel to a rolling direction, 13B tensile test pieces described in JIS Z 2201 were adopted and tensile strength was obtained according to JIS Z 2241. The tensile strength of respective steel foils which are steel foils that remains as the test material (steel foils only subjected to rolling) and steel foils after heating at 400° C. for 30 minutes was obtained. The tensile strength after heating was obtained as a reference value because the steel foils might be heated in a battery manufacturing process. However, since the values of tensile strength required for the steel foils after heating varied depending on batteries, determination of whether the tensile strength of the steel foils after heating was acceptable was not particularly performed.

Electric resistance: Volume resistivity was measured at 20° C. using a four-terminal method. A sample with an electric resistance of less than 14 μΩcm was evaluated as Grade A, a sample with an electric resistance of 14 μΩcm or more and less than 16 μΩcm was evaluated as Grade B, a sample with an electric resistance of 16 μΩcm or more and less than 20 μΩcm was evaluated as Grade C, and a sample with an electric resistance of 20 μΩcm or more was evaluated as Grade D. The samples with Grades A and B were acceptable.

The tensile strength and the electric resistance are shown together in Table 1. However, the over-discharge solubility in all Examples was better than the over-discharge solubility of a Cu foil, and there was no big difference between levels, and thus, the over-discharge solubility was not shown in Table 1 (3.5 V to 3.6 V in all Examples and Comparative Examples while a Cu foil was 3.4 V). In Examples of the present invention, the tensile strength and the electric resistance between which a trade-off relationship is easily established are compatible. When a value is not within the range of the present invention, tensile strength and electric resistance are incompatible.

Examples 22 to 25 and Comparative Example 10

Various plating was formed on the steel foil manufactured in Example 1 by an electro plating method. The conditions for Ni plating were as follows. The steel foil was plated with Ni at various adhesion amounts at a bath temperature: 65° C. and a current density: 20 $A/dm^2$ by using a bath composed of Ni sulfate: 320 g/l, Ni chloride: 70 g/l, and boric acid: 40 g/l.

The conditions for Cr plating were as follows. The steel foil was plated with Cr at various adhesion amounts at a bath temperature: 50° C. and a current density: 50 $A/dm^2$ by using a bath composed of chromic anhydride: 150 g/l and sulfuric acid: 1.5 g/l. The conditions for Zn plating were as follows. The steel foil was plated with Zn at a bath temperature: 60° C. and a current density: 50 $A/dm^2$ by using a bath composed of Zn sulfate: 250 g/l, sulfuric acid: 15 g/l, and sodium sulfate: 50 g/l.

Examples 26 to 29 and Comparative Example 11

Various plating treatments were performed on the steel foil manufactured in Example 9 in the same manner as in the above examples.

Comparative Example 12

The steel foil manufactured in Example 19 was subjected to Cu strike plating in an amount of 1 $g/m^2$ in a plating bath composed of copper pyrophosphate: 80 g/l, potassium pyrophosphate: 300 g/l, and aqueous ammonia: 3 ml/l in advance, and then, subjected to Cu plating in an amount of 20 g/m² at a solution temperature: 40° C. and a current density: 10 A/dm² by using a bath composed of copper sulfate: 210 g/l and sulfuric acid: 45 g/l.

The evaluation method is the same as in the above examples.

The results are shown in Table 2.

Cu was further softened by the heating, the tensile strength of the steel foil was further deteriorated after the heating.

Examples 30 to 33 and Comparative Examples 13 to 14

Various plating was formed on the cold-rolled steel sheet (annealed material, 0.3 mm) used in Example 1. A Ni plating treatment was performed under the same conditions as in the

TABLE 2

| | | FOIL USED | PLATING DEPOSITION | | OVER-DISCHARGE SOLUBILITY | | STRENGTH MPa | | ELECTRIC RESISTANCE μΩcm |
|---|---|---|---|---|---|---|---|---|---|
| | | | KIND OF PLATING | AMOUNT g/m² | SOLUBILITY POTENTIAL V | EVALUATION | ONLY ROLLED | AFTER HEATING | |
| EXAMPLES | 1 | EXAMPLE 1 | — | — | 3.5 | B | 1056 | 997 | 12.5 |
| | 22 | SAME AS EXAMPLE 1 | Ni | 9 | 3.7 | A | 1050 | 990 | 12.4 |
| | 23 | SAME AS EXAMPLE 1 | Ni | 20 | 3.9 | A | 1014 | 989 | 12.6 |
| | 24 | SAME AS EXAMPLE 1 | Cr | 0.05 | 3.8 | A | 1058 | 997 | 12.7 |
| | 25 | SAME AS EXAMPLE 1 | Cr | 0.1 | 4.2 | A | 1056 | 997 | 12.4 |
| | 9 | EXAMPLE 9 | — | — | 3.5 | B | 1001 | 950 | 12.2 |
| | 26 | SAME AS EXAMPLE 9 | Ni | 9 | 3.7 | A | 999 | 948 | 12.1 |
| | 27 | SAME AS EXAMPLE 9 | Ni | 20 | 3.9 | A | 989 | 941 | 12.4 |
| | 28 | SAME AS EXAMPLE 9 | Cr | 0.05 | 3.8 | A | 1002 | 951 | 12.3 |
| | 29 | SAME AS EXAMPLE 9 | Cr | 0.1 | 4.2 | A | 1001 | 948 | 12.6 |
| COMPARATIVE EXAMPLES | 10 | SAME AS EXAMPLE 1 | Zn | 10 | 3 | D | 1057 | 750 | 12.5 |
| | 11 | SAME AS EXAMPLE 9 | Zn | 10 | 3 | D | 1000 | 512 | 12.5 |
| | 12 | SAME AS EXAMPLE 19 | Cu | 20 | 3.4 | C | 702 | 650 | 10.1 |

The over-discharge solubility could be improved by the Ni or Cr plating, compared to the Cu level (3.4 V). As shown in Comparative Examples, the over-discharge solubility of the steel foils plated with Zn was deteriorated compared with Cu. The over-discharge solubility of the steel foil plated with Cu was at the same level as Cu, and an effect of improvement was not found.

Further, the tensile strength of the steel foils plated with Zn was reduced after the heating. This is because Zn forms a weak Zn—Fe intermetallic compound layer by the heating, and the fracture of the steel foil is caused from the destruction of this layer. The tensile strength of the steel foil plated with Cu was also deteriorated. This is because Cu which is very soft compared to steel is present on the surface. Since above examples. The conditions for Ni—P plating were as follows.

Ni—P plating of P 5% was formed on the surface of the steel sheet at a bath temperature: 60° C. and a current density: 20 A/dm² by using a bath composed of Ni sulfate: 300 g/l. Ni chloride: 70 g/l, boric acid: 40 g/l, and phosphorous acid: 10 g/l.

When a heat treatment was performed after the plating, the heating treatment was performed at 400° C. for 30 minutes. After the plating, the steel sheet was rolled under a cumulative rolling reduction of 95% to manufacture a steel foil having a thickness of 15 μm.

The evaluation method is the same as in the above examples.

The results are shown in Table 3.

TABLE 3

| | | PLATING DEPOSITION | | HEATING | OVER-DISCHARGE SOLUBILITY | | STRENGTH MPa | | ELECTRIC RESISTANCE μΩcm |
|---|---|---|---|---|---|---|---|---|---|
| | | KIND OF PLATING | AMOUNT g/m² | CONDITION ° C. | SOLUBILITY POTENTIAL V | EVALUATION | ONLY ROLLED | AFTER HEATING | |
| EXAMPLES | 30 | Ni | 10 | 300 | 3.7 | A | 1051 | 1001 | 12.3 |
| | 31 | Ni | 10 | 400 | 3.8 | A | 1055 | 999 | 12.4 |
| | 32 | Ni | 20 | 300 | 3.9 | A | 1057 | 1002 | 12.6 |
| | 33 | Ni | 20 | 400 | 3.9 | A | 1058 | 996 | 12.4 |
| COMPARATIVE EXAMPLES | 13 | Ni—P | 10 | NONE | 3.5 | B | 560 | 558 | 12.6 |
| | 14 | Ni—P | 10 | 400 | 3.5 | B | 544 | 543 | 12.6 |

The over-discharge solubility could be improved by the Ni plating, compared to the Cu level (3.4 V). In addition, there was no decrease in tensile strength due to the Ni plating. However, as shown in Comparative Examples, the tensile strength of the steel sheets plated with Ni—P was remarkably reduced.

Ni—P is amorphous and very hard in a plated state (in a state where only plating is performed), and if heated, Ni—P is further hardened by precipitation of a $Ni_3P$ compound. In a state where such a layer was formed on the outermost layer, when rolling with a high cumulative rolling reduction was performed, cracks frequently occurred on the plated layer and the cracks reached the steel foil of the substrate. Therefore, the tensile strength was reduced.

INDUSTRIAL APPLICABILITY

As described above, according to the present invention, it is possible to obtain a steel foil which is thin, high in strength, lightweight, and economic. As a result, since it is possible to improve performance, stability and economic efficiency of a secondary battery such as lithium ion battery, the present invention has high industrial applicability.

BRIEF DESCRIPTION OF THE REFERENCE SYMBOLS

1: FOIL-ROLLING PROCESS
2: PLATING PROCESS
3: PLATING PROCESS BEFORE ROLLING

The invention claimed is:
1. A steel foil consisting of, by mass %:
C: 0.0001 to 0.02%;
Si: 0.001 to 0.01%;
Mn: 0.01 to 0.3%;
P: 0.001 to 0.02%;
S: 0.0001 to 0.01%;
Al: 0.01 to 0.1%;
N: 0.0001 to 0.004%;
including one or both of, by mass %:
Ti: 0.01 to 0.1%; and
Nb: 0.005 to 0.1%; and
a balance consisting of Fe and impurities, wherein
a thickness is 5 μm or more and 15 μm or less, and a tensile strength is more than 900 MPa and 1,200 MPa or less, and
wherein a volume resistivity is less than 16 μΩcm.
2. The steel foil according to claim 1,
wherein a Ni plated layer or a Cr plated layer is included on an outermost layer of the steel foil.
3. A method for manufacturing a steel foil, the method comprising, foil-rolling a steel sheet consisting of, by mass %,
C: 0.0001 to 0.02%,
Si: 0.001 to 0.01%,
Mn: 0.01 to 0.3%,
P: 0.001 to 0.02%,
S: 0.0001 to 0.01%,
Al: 0.01 to 0.1%,
N: 0.0001 to 0.004%,
including one or both of, by mass %:
Ti: 0.01 to 0.1%; and
Nb: 0.005 to 0.1%; and
a balance consisting of Fe and impurities, so as to be the steel foil having a thickness of 5 μm or more and 15 μm or less and a tensile strength of more than 900 MPa and 1,200 MPa or less and a volume resistivity of less than 16 μΩcm by a cold-rolling under a cumulative rolling reduction of 90% or more and 98% or less.
4. The method for manufacturing a steel foil according to claim 3, further comprising,
plating an outermost layer of the steel foil so as to form a Ni plated layer or a Cr plated layer after the foil-rolling.
5. The method for manufacturing a steel foil according to claim 4, wherein the Ni plated layer is a soft Ni plated layer.
6. The method for manufacturing a steel foil according to claim 3, further comprising,
plating an outermost layer of the steel sheet so as to form a Ni plated layer before the foil-rolling.
7. The method for manufacturing a steel foil according to claim 6, wherein the Ni plated layer is a soft Ni plated layer.
8. The steel foil according to claim 1,
wherein a content of Mn is 0.01 to 0.2% by mass.
9. The steel foil according to claim 2,
wherein a content of Mn is 0.01 to 0.2% by mass.

\* \* \* \* \*